United States Patent [19]

Matiere

[11] Patent Number: 5,281,053
[45] Date of Patent: * Jan. 25, 1994

[54] UNDERGROUND TUBULAR STRUCTURAL SYSTEM AND PROCESS FOR PRODUCING IT

[76] Inventor: Marcel Matiere, 17 Avenue Aristide Briand, 15000 Aurillac, France

[*] Notice: The portion of the term of this patent subsequent to Mar. 3, 2009 has been disclaimed.

[21] Appl. No.: 838,681

[22] Filed: Feb. 21, 1992

Related U.S. Application Data

[63] Continuation of Ser. No. 506,288, Apr. 6, 1990, Pat. No. 5,092,710.

[30] Foreign Application Priority Data

Apr. 10, 1989 [FR] France .................. 89 04691

[51] Int. Cl.$^5$ .................................. E01F 5/00
[52] U.S. Cl. .................. 405/149; 405/124; 405/134; 52/89; 138/105; 138/116
[58] Field of Search .......... 405/124, 126, 132, 133, 405/134, 135, 149, 150.1; 52/89; 138/105, 111, 114, 115, 116, 117

[56] References Cited

U.S. PATENT DOCUMENTS

| | | | |
|---|---|---|---|
| 527,597 | 10/1894 | Edwards | 138/116 |
| 527,871 | 10/1894 | Morrow | 138/116 |
| 987,398 | 3/1911 | Potter | 138/115 |
| 2,010,484 | 8/1935 | Gunderson | 405/134 |
| 4,685,829 | 1/1987 | Matiere | 405/149 X |
| 4,869,294 | 9/1989 | Matiere | 138/105 |
| 5,092,710 | 3/1992 | Matiere | 405/124 X |

FOREIGN PATENT DOCUMENTS

| | | | |
|---|---|---|---|
| 2461863 | 7/1976 | Fed. Rep. of Germany | |
| 2379653 | 9/1978 | France | |
| 8600683 | 1/1986 | PCT Int'l Appl. | |
| 1087670 | 4/1984 | U.S.S.R. | 405/132 |
| 675616 | 7/1952 | United Kingdom | |

Primary Examiner—Randolph A. Reese
Assistant Examiner—Arlen L. Olsen
Attorney, Agent, or Firm—Pollock, Vande Sande & Priddy

[57] ABSTRACT

An underground tubular structural system capable of having a very large cross section, for the construction of urban or rural conduits, underground passages and other civil engineering installations. At least two conduits (S1) (S2), namely, a high conduit (S2) and a low conduit (S1), are superposed and at least the high conduit (S2) is formed in cross section by at least two prefabricated elements, namely a lower element (4) (6) in the shape of an inverted U capping the low conduit (S1) and bearing along two lateral sides (14) of the latter and an upper covering element (2') (5) capping the lower element (4) (6) of the high conduit and closing the section (S2) towards the top. One or more supplementary conduits can easily be added to an already existing conduit.

9 Claims, 2 Drawing Sheets

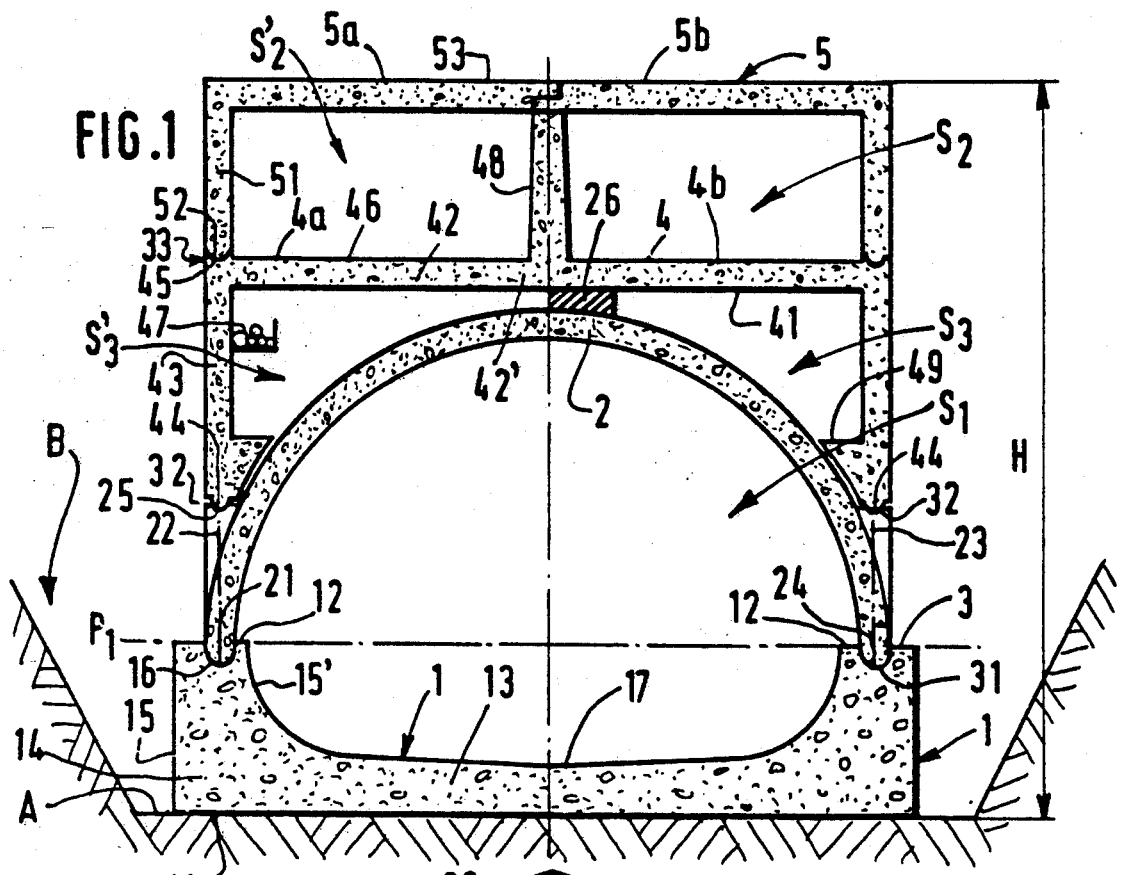
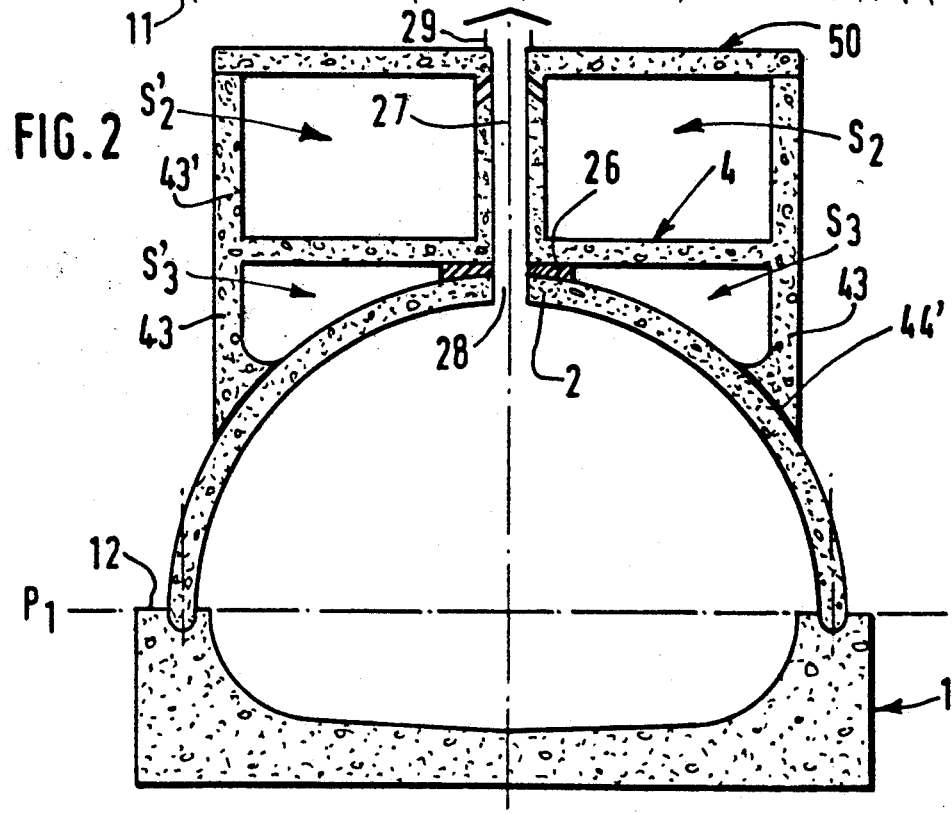

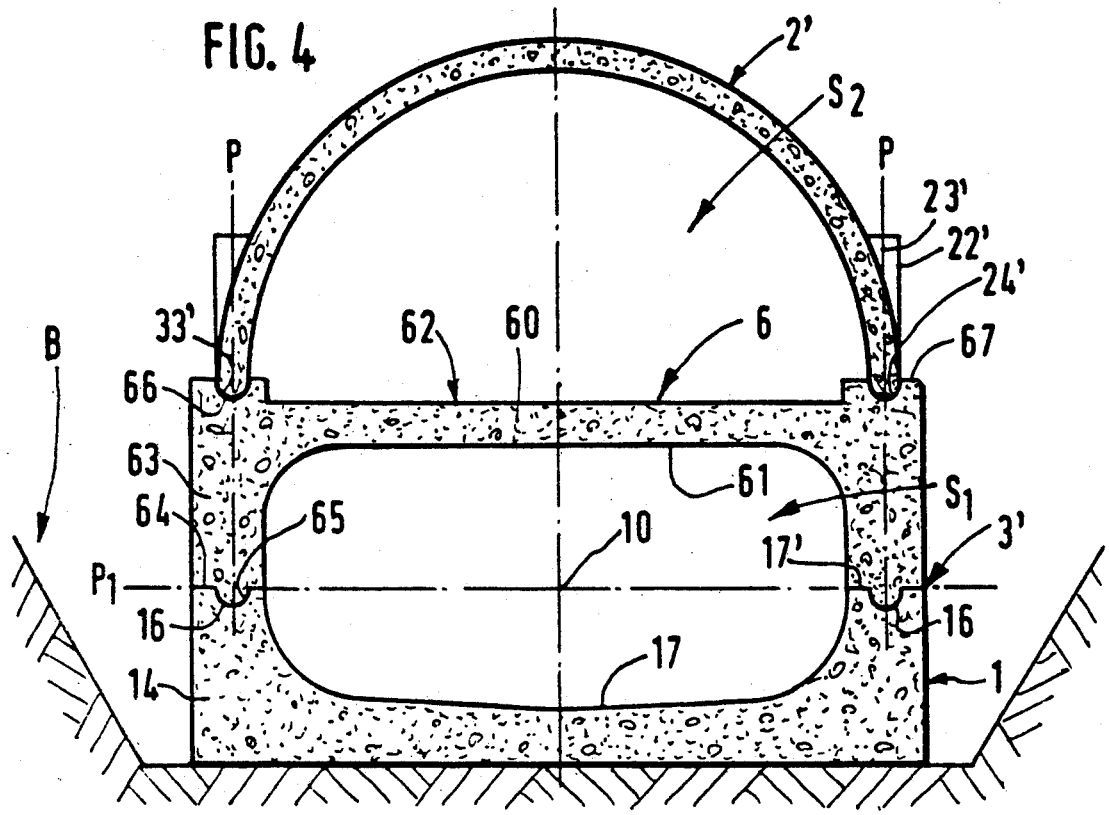
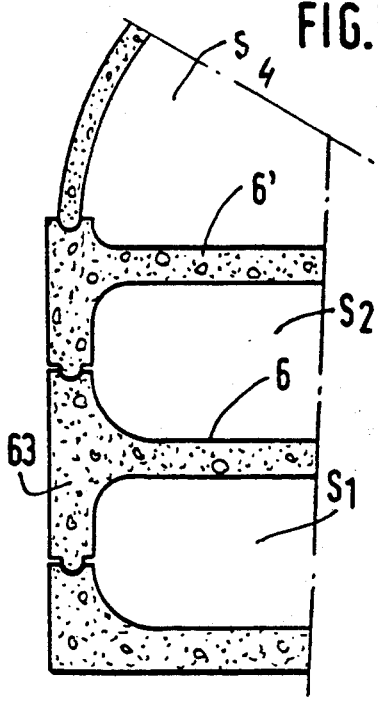
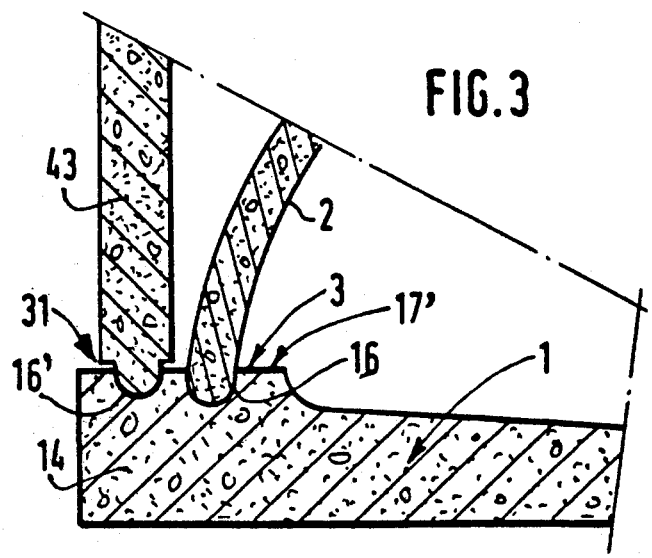

UNDERGROUND TUBULAR STRUCTURAL SYSTEM AND PROCESS FOR PRODUCING IT

This is a continuation of application Ser. No. 07/506,288, filed Apr. 6, 1990, now U.S. Pat. No. 5,092,710.

FIELD OF THE INVENTION

The invention relates to an underground tubular structural system formed by a plurality of associated conduits, and also includes an original process allowing one or more supplementary conduits to be added to an existing conduit.

BACKGROUND OF THE INVENTION

It is known that, to produce underground conduits or tunnels, even those of large dimensions, when the height of earth supporting the tunnel is limited, it is preferable to make a trench, to construct the tunnel in the open air and then to fill in the trench.

Depending on the cross section of the conduit, the latter can be constructed in different ways, for example of stonework or indeed of associated prefabricated elements. An original process has already been described, in applicant's European Patent No. 081402, for the construction of tubular hollow structures which may have a very large cross section, possibly corresponding to the size of the road, and which are intended to be positioned on the bottom of a trench which is filled in after such positioning. In this process, the conduit is formed by a plurality of associated longitudinal elements forming a group of adjacent segments placed end to end along a longitudinal direction, each element covering part of the cross section in the transverse direction and covering the length of the corresponding segment in the longitudinal direction.

To construct the conduit, a trench is thus opened down to the desired base level, the bottom of this trench forming a flattened resting surface on which there is positioned a certain number of segments placed end to end and connected to one another, for example, by two longitudinal girders embedded in the bed plate, and the trench is then closed.

In the embodiment described in the above-noted patent, each segment comprises a lower element forming a bed plate which rests on the bottom of the trench, two side elements positioned on either side of the bed plate and each equipped at its base with a stabilizing part allowing it to remain upright on the ground without being supported, and an arch element which rests on the upper ends of the side elements.

In another embodiment, European Patent No. 0181402, describes another type of structure which may also have a large cross section and in which each segment is formed by two elements, namely, a lower element forming a flat bed plate and an upper element in the form of a curved arch resting by means of its lower ends on bearing members made along the lateral sides of the bed plate.

In this manner, it is possible to produce conduits for the greatest variety of applications, for example sewage, water supply, underground passages, for example below a railway or a highway, for pedestrians, livestock, a river, etc.

However, it is sometimes necessary to construct structural systems formed by a plurality of associated conduits, allowing different uses. For example, an urban heating conduit may be associated with passages for electrical cables or various ducts, for water, gas, etc.

In rural locations, it may also be advantageous to associate with an underground conduit for the passage across a river another passage, for example for pedestrians or livestock.

When such a need becomes apparent at the time of construction, it is simple to produce in the same trench a plurality of conduits placed one next to the other, but it is then necessary to increase the width of the trench and thus the volume of earth moved and the areas compulsorily purchased.

Moreover, it is possible that the need to provide a supplementary conduit or one of larger passage cross section may become evident well after construction of the structural system.

SUMMARY OF THE INVENTION

The invention provides a solution to this type of problem and thus has as its subject a novel type of tubular structural system formed by a plurality of associated sections, and particular processes enabling the construction of a plurality of associate conduits or the addition of a new conduit to an existing conduit.

In accordance with the invention, such a tubular structural system is formed by at least two superposed conduits, namely, a low conduit resting on the ground and a high conduit positioned above the low conduit and formed in cross section by at least two prefabricated elements, namely, a lower element in the shape of an inverted U straddling the low conduit and comprising a floor extending horizontally above the low conduit and resting on two substantially vertical lateral parts which bear on the low conduit respectively along the two lateral sides of the latter, and an upper covering element straddling the lower element by closing the section towards the top and resting on two longitudinal bearing members on the upper face of each lateral part of the lower element.

The low conduit may be an already existing structural system produced, for example, of masonry, and thus simple to uncover to produce the high conduit.

However, the low conduit, like the high conduit, may also be produced from prefabricated elements, for example in the manner described in applicant's above-mentioned patent.

In a particularly advantageous embodiment, the structural system according to the invention comprises in cross section a first element forming a bed plate resting on the ground and comprising the lower element of the low conduit, an intermediate element resting on the lower element and comprising on one side the upper element for covering the low conduit and on the other side the lower element of the high conduit, and at least one upper element for covering the high conduit, resting on the same intermediate element, the latter being equipped along its lateral sides and on its two opposing faces, respectively the lower and the upper, with longitudinal members, respectively for bearing on the lower element of the low conduit and for bearing the upper element of the high conduit.

In particular, the intermediate element may be equipped with a lower face curved in the shape of an arch forming the ceiling of the low conduit and with a substantially flat upper face forming the bottom of the high conduit.

In another advantageous embodiment, the tubular structural system according to the invention comprises in cross section a first lower element resting on the ground and forming a bed plate for the low conduit, a first upper element for covering the low conduit, resting on the first lower element along two longitudinal bearing members, a second lower element forming the bottom of the high conduit and having a lower face in the shape of an inverted U capping the first upper element and comprising two lateral flanks which extend downward, at right angles and whose lower ends bear on one of the elements of the low conduit, and a second upper element for covering the high conduit, resting on the second lower element.

The longitudinal bearing parts on which the two lateral flanks of the second lower element rest may be made on the first upper element along the lateral sides of the latter, or else on either side of the bearing members of the first upper element along the lateral sides of the first lower element.

Preferably, the longitudinal bearing members placed between two elements, respectively the upper and the lower, comprise an elongate centering shoulder projecting along the lateral side of one of the elements and engaging, when the elements are placed one on the other, in a corresponding groove made hollow along the corresponding lateral side of the other element. The centering shoulder and the groove advantageously have rounded profiles which are respectively convex and concave, with a difference in curvature providing for slight transverse play so as to give the bearing member thus formed a certain possibility of articulation about a longitudinal axis.

However, the invention is not limited merely to the production of two superposed conduits, since it is possible by applying the same methods to place three conduits or even more one on the other, each high conduit resting on the conduit placed below it and the low conduit resting on the ground.

Thus, the invention allows tubular structural systems formed by a plurality of superposed conduits to be produced rapidly, with a small workforce and little equipment. Furthermore, the particular structure of such a structural system means that, after a conduit has been put in place, it is quite easy to add to it one or more supplementary conduits.

For this purpose, it is possible to leave the existing conduit in place. In this case, once the trench has been opened to completely uncover the conduit already made, the latter is covered by a supplementary conduit comprising in cross section a lower element in the shape of an inverted U comprising a central part passing above the upper element of the existing conduit and two lateral flanks bearing on one of the elements of the existing conduit along its lateral sides, and there is then placed on the said U-shaped element an upper covering element closing towards the top in cross section the supplementary conduit thus formed, and the trench is then closed.

However, if the existing conduit is of the type comprising a bed plate element covered by an upper element forming an arch, it may be advantageous to exploit this particular feature.

In fact, once the trench has been opened to the extent that the conduit is completely uncovered, the upper element may be removed to be replaced by an intermediate element comprising a central part forming a floor and two lateral parts equipped at their lower ends with longitudinal bearing members resting on corresponding members in the lower element and having on their upper face longitudinal bearing members similar to those of the lower element. The high conduit is then closed by again placing, on the intermediate element, the upper element previously removed, or else another upper element, the latter coming to rest on the bearing member of the upper face of the intermediate element.

It will be seen that in a general way the invention allows either the addition to an existing conduit of one or more supplementary conduits without particular difficulty other than the necessity of reopening the trench, or the construction from the outset of a plurality of superposed conduits. This possibility will in some cases be very advantageous, for example to pass through a narrow site or else to allow several grantees to benefit from the same width of acquired land.

BRIEF DESCRIPTION OF THE DRAWINGS

Other characteristic features and advantages of the invention will emerge from the description which follows with reference to the attached drawings, in which several embodiments of the invention are shown by way of example.

FIGS. 1 and 2 show in cross section two variants of a structural system having superposed sections, in accordance with a first embodiment of the invention.

FIG. 3 is a detail view showing a variant of a lower bearing member.

FIG. 4 is a cross sectional view of a structural system having superposed sections in accordance with a second embodiment of the invention.

FIG. 5 shows in schematic form an extension to a conduit having three superposed sections.

DESCRIPTION OF PREFERRED EMBODIMENTS

FIG. 1 shows schematically a tubular structural system formed by two superposed conduits, namely a low conduit S1 and a high conduit S2.

In the embodiment shown, the conduit S1 is formed in a manner known per se by two elements, namely a lower element 1 and an upper element 2 placed on the lower element 1.

The latter forms a flat bed plate 13 made higher on each of its lateral sides by a wall 14 comprising, for example, a vertical outer face 15 and a curved inner face 15' connected to the upper face 17 of the bed plate 13, which thus forms the bottom of the conduit S1.

Preferably, the bed plate 13 is equipped with a flat lower face 11 which rests on the flattened banked up bottom A of a trench B.

The upper element 2 for covering the lower conduit S1 is formed by a wall curved in the shape of a semicircular arch resting by means of its lower ends 21 on the upper ends 12 of the lateral walls 14 by way of longitudinal bearing members 3. Preferably, each longitudinal bearing member 3 is formed by conjugate parts made respectively hollow and projecting on the two elements 1 and 2 and engaging in one another. For example, in the embodiment shown, the bearing member 3 comprises a concave groove 16 in the upper end 12 of the lateral wall 14 of the lower element 1 and on the bottom of which rests a convex rounded face 24 on the edge of the lower end 21 of the upper element 2.

Thus, each lateral bearing of the arch 2 on the bed plate 13 is articulated about an axis parallel to the longitudinal direction of the conduit S1, the convex faces 24 having a curvature which is slightly greater than that of the concave grooves 16 so as to provide a slight transverse play.

Furthermore, it is advantageous to fix the upper element 2 on the lower element 1 by means of webs 23 which are oriented substantially along vertical planes passing through the bottom of the grooves 16 and whereof one end is screwed or anchored in the lateral wall 14 of the lower element 1, the other end forming a head bearing on a boss 22 made on the lateral side of the upper element 2. This arrangement obviates the risk of the sliding of articulated bearings, provides resistance to internal pressures, for example if the conduit S1 is used for the circulation of liquids or fluids under pressure, in particular in urban heating systems.

In the embodiment of FIG. 1, the high conduit S2 comprises a lower element 4 whereof the face 41 turned downwards has the shape of an inverted U, which enables it to cap the upper element 2 of the low conduit S1. To this end, the lower element 4 of the high conduit S2 may advantageously comprise a central part in the form of a horizontal plate 42 and two lateral flanks 43 which extend downward at right angles and rest on the low conduit S1 by means of longitudinal bearing members 32.

In FIG. 1, for example, each bearing member 32 comprises a concave groove 25 which is made in the upper part of the boss 22 and in which there comes to bear a rectilinear shoulder with rounded face 44 along the lower end of the lateral flank 43. Of course, if the conduit S1 is equipped with holding webs 23, the upper heads of the latter may be positioned in hollows made in the bottom of the grooves 16 so that positioning of the element 4 is not hindered.

Where necessary, the horizontal plate 42 may also bear on the arch 2, for example on the crown thereof; this allows the plate 42 to be made lighter, the arch 2 having greater resistance to vertical loads.

Such a central bearing 26, which has been shown on only one side in FIG. 1, to indicate that it is optional, also allows the construction element 4 to be made in two parts, respectively 4a and 4b, each bearing outwards through its flank 43 on an outer lateral bearing 32 and inwards through an inner side 42' on the crown of the arch 2 by way of the central bearing 26. Such an arrangement allows the weight of the element 4 to be reduced for large sections, and transport and positioning thereof to be facilitated, but it naturally presupposes that the arch of the low conduit S1 is sufficiently strong to resist forces transmitted through the central bearing (26).

The high conduit S2 is closed by an upper covering element 5 which rests on the lower element 4 by means of longitudinal bearing member 33 which may also advantageously be formed by rectilinear shoulders 52 having convex rounded faces and formed along the lower lateral ends 51 of the covering element 5 and each engaging in a concave groove 45 formed along each lateral side of the upper face 46 of the lower element 4. The upper element 5 may be in the form of a curved arch, like the first upper element 2, or indeed, as shown in the drawing, may have a central part 53 in the form of a plate, extended on its lateral sides by downwardly extending vertical flanks 51. Such an arrangement in fact allows the total height H of the structural system to be reduced; this may be important if the height of the embankment is limited, and, for example, the horizontal plate 53 is to be used to form an upper passage.

As shown in FIG. 1, if the upper plate 53 extends too far, it may bear on a vertical partition 48 or a series of pillars positioned on the lower plate 4 in the central plane of the conduit. The upper element 6 may thus be formed by a plurality of attached parts. In that case, the high conduit is divided into two parallel sections S2, S'2, which may be useful, for example, for allocating different functions to the two sections S2, S'2.

By contrast, if the height of the unit does not need to be limited, it may be advantageous to give the upper element 5 the shape of an arch similar to the arch 2, thereby giving it better resistance to applied loads and allowing the passage section of the high conduit S2 to be increased.

As indicated for the lower element 4, the presence of an intermediate partition 48 makes it possible to form the upper element 5 in two parts, respectively a left part 5a and a right part 5b, attached along the two lateral sides opposite one another and bearing on the central partition 48 and each bearing outwards through a flank 51 on a longitudinal bearing 33.

There has thus been produced a structural system comprising two superposed tubular conduits S1, S2 to which may be added the intermediate space formed by two parts S3, S'3 which have cross sections in the shape of a curved triangle and which could advantageously be used, for example, for passing ducts or electrical cables carried by supports 47 fixed to the lateral flanks 43 or to the upper face of the arch 2.

In order to better use these triangular parts S3, S'3, there may be added to the base of the lateral sides 43 of the lower element 4 broadened parts 49 which extend inwards in the manner of a ledge and which provide a substantially flat upper face facilitating the circulation and/or positioning of ducts, and a lateral face substantially matching the shape of the arch 2.

FIG. 2 shows a variant of this embodiment of the invention which may in particular be used when the upper conduit S2 must have a smaller section.

In this case, in fact, the lower element 4 of the high conduit rests directly through its central part on the crown of the first upper element 2, for example by way of a shock-absorbing cushion 26 of suitable nature.

The lower ends 44' of the lateral flanks 43 of the second lower element 4 may be formed by plain centering faces inclined in congruence with the profile of the upper face of the arch element 2 so as to bear simply and laterally on the latter for the centering of the upper element.

Such an embodiment may be used when the upper conduit S2 is of small dimension and no bearing member has been provided in advance on the upper element 2.

In other cases, it may be advantageous to use the embodiment shown in FIG. 3, in which the lateral flanks 43 of the lower element 4 of the high conduit S2 bear directly on the lateral sides 14 of the bed plate element 1.

To this end, the longitudinal bearing members 31 may be positioned alongside the bearing members 3 of the arch element 2 on the element 1. Each supplementary bearing member 31 may in this case be formed by a concave groove 16' made in the upper face of the lateral side 14 of the bed plate 13, broadened for this purpose where appropriate.

Such an arrangement allows all bearing forces to be applied directly to the bed plate element 13, which transmits them to the ground and may be provided accordingly.

Of course, the shapes given to the different longitudinal elements of conduit construction may be varied as a function of the passage sections to be produced, the shape of the low conduit elements if an existing conduit is being altered, and the rules to be followed for construction.

By way of example, in FIG. 2, the second upper element 4 is equipped along its lateral sides with vertical flanks 43' which extend upwards in continuation of the flanks 43 for bearing on the low conduit, and the upper element 5 rests on these flanks 43' and may be formed by a planar plate 50.

Furthermore, it is possible in all cases to provide one or more vertical partitions 48 which allow the high conduit to be divided into two or more sections S2, S'2 which may be used for different purposes.

It may also be useful to provide, in the upper element of one or the other of the conduits S1, S2, a venting orifice, for example in the case where the products present in the conduit may give off dangerous gases which must not be allowed to accumulate.

By way of example, FIG. 2 illustrates an air shaft 27 which leads from an orifice 28 in the arch 2 and which passes successively through the floor 4 and the second plate 50, in which there is an orifice 29, and which opens out outside the conduit, and through which the gases are discharged into the slope. Of course, the shaft 27 could also be extended over the entire height filling the trench B.

The other sections S2, S'2, or S3, S'3 may also, where necessary, communicate with the shaft 27 through suitable orifices.

FIG. 4 shows in cross section another embodiment of a segment of tubular structural system, again comprising two superposed sections S1, S2.

In this case, however, the upper element for covering the low conduit S1 is formed by an intermediate element 6 whereof the lower face 61 forms the arch closing the top the low conduit S1, while its upper face 62 forms the bottom of the high conduit S2, the latter being in turn closed towards the top by an upper element 2' which may have a semicircular arch shape identical to that of the upper element 2 of the low conduit S1 in the case of FIGS. 1 and 2.

To this end, the intermediate element 6 comprises a central part 60 in the form of a horizontal plate equipped o its sides with two lateral flanks 63 extending downward at right angles, such that their lower ends 64 rest on the lower element 1 by way of longitudinal bearing members 3'.

As before, each longitudinal bearing member 3' comprises a concave groove 16 which is made in the upper face 12' of the lateral side 14 of the bed plate element 1 and in which there engages a rectilinear centering shoulder 65 having a convex rounded face made on the lower end 64 of the lateral flank 63. Preferably, the shoulder 65 has a convex curvature which is slightly greater than the concave groove 16, and the opposing faces 64 and 12' of the lateral sides, respectively 63 of the intermediate element 6 and 14 of the lower element 1, are separated by a space permitting the bearing member 3' a certain degree of articulation about an axis parallel to the longitudinal direction of the structural system. The lower face 61 of the intermediate element 6 has the shape of an inverted U the profile of which is determined in dependence on that of the upper face 17 of the bed plate element 1, to provide the low conduit S1 with the desired passage cross section.

In the same manner, the upper face 62 of the intermediate element 6 may be in the form of a planar horizontal plate, or may have raised edges, like the lower element 1, to increase the passage section of the high conduit S2, by raising the bearing members 33' of the upper element 2' on the intermediate element 6.

In fact, the latter is equipped on its upper face 62 with two concave lateral grooves 66 in which the lower convex edges 24' of the upper element 2' come to rest. Here, too, the latter edges have a convex curvature which is greater than the concave grooves 66 so as to provide the necessary play for articulation of the longitudinal bearing member 33' about a longitudinal axis.

Where appropriate, holding members 23' such as webs centered in the vertical central plane P of each concave groove 66 may ensure that the upper element 2' is applied with pressure to the intermediate element 6, each web 23' being anchored or screwed by way of its lower end into the lateral flank 63 of the intermediate element 6 and bearing by means of its upper end on a boss 22' formed on the side of the upper element 2'.

The webs 23' may be formed by pre-stressing rods passing through aligned vertical orifices in the bosses 22' and in the lateral flanks 63 of the intermediate element 6, such that they are anchored in the lateral sides 14 of the lower element 1 so as to secure all the elements. Of course, other attachment means can be used, for example pre-stressing cables surrounding the whole of the structural system.

The present invention is not limited to the production of structural systems having only two superposed sections and, by way of example, FIG. 5 shows a structural system comprising two superposed intermediate elements 6, 6' and allowing three conduits, a low conduit S1 and two high conduits S2 and S'2, to be delimited.

As indicated above, the intermediate elements 6, 6' have lateral flanks 63 which may be extended upwards or downwards so as to produce the desired passage sections.

The various embodiments which have just been described enable an existing structural system to be altered in a very advantageous manner so that one or even more supplementary conduits may be added to it.

In fact, in the case of FIG. 1 and 2, the high conduit S2 may be placed on a previously constructed conduit S1. If it proves necessary to add a supplementary conduit, the trench B may be reopened by removing the fill so as to completely free the already produced conduit S1 and, without altering the configuration of the later, it may be capped by a second lower element 4 on which there comes to rest a second upper element 5 so as to produce the second conduit S2.

To this end, it is advantageous to provide in advance on the first upper element 2 of the low conduit S1 the bosses 22 equipped with concave grooves 25 to form the longitudinal bearing members 32 of the high conduit. However, it is also possible to position the latter itself, if appropriate bearing members have not been provided in advance.

In simple cases, it is possible to use, for example, the embodiment of FIG. 2. In other cases, bearing bosses may be added when needed on either side of the upper element 2, or may come to bear directly on the lateral sides 14 of the bed plate element, if these lateral sides are sufficiently wide, as shown in FIG. 3. Supplementary bearing 16' may then be provided on longitudinal bars which are positioned along each side of the bed plate of the low conduit and which have a sufficient contact surface and resistance. Such an embodiment is preferred for altering an existing conduit.

Furthermore, while the use of articulated bearing members comprising conjugate hollow and projecting parts has advantages, in certain cases, and in particular for average sections in the order of 1 to 2 m² and for relatively shallow fills, for example in urban locations, it is possible to omit the articulations and to cause the second lower element 4 simply to bear directly on the low conduit S1 by way of flat surfaces.

Moreover, if it is not envisaged to redismantle the structural system in order to act on the inside of any of the conduits, it is also possible to produce bearing parts in the form of joints which are concreted in position and which definitively secure the elements to one another, according to one of the embodiments of joints described in European Patent 0081402.

The embodiment of FIGS. 1 and 2 thus enables a supplementary conduit S2 to be added to an existing conduit S1 without acting on the latter other than opening the trench, and will be used in particular when the low conduit is produced in a conventional manner from masonry.

On the other hand, when the low conduit S1 is produced from two superposed elements, it will be advantageous to use the embodiment shown in FIG. 4. In this case, in fact, after opening the trench B to free the previously produced conduit S1, the element 2' covering the latter is removed by loosening, where appropriate, the anchoring rods 23', and is replaced by the intermediate element 6 which closes the low conduit S1. It is for this reason that the centering shoulders 65 on the lower edges of the intermediate element 6 must have a profile identical to that of the lower edges 24' of the upper element 2'. Similarly, the concave grooves 66 in the two sides of the upper face 62 of the element 6 have a profile identical to that of the grooves 16 of the lower element 1.

As indicated above, the profile of the lower face 61 of the intermediate element 6 may be determined if necessary so as to preserve the passage cross section of the low conduit S1.

After the intermediate element 6 has been put in place, it may be covered by the upper element 2' which previously covered the low conduit S1, so that the high conduit S2 is closed.

It is simple to provide, where necessary, anchoring means 23' sufficiently long to secure the entire unit.

It will be seen that the invention lends itself to a number of variants and is thus not limited only to the embodiments which have just been described by way of example.

In particular, the invention could be applied to other conduits, such as those described in European Application 081402, and in particular to a four-element conduit comprising a lower bed plate element, two side elements and an arch element. In this case, there could be provided on the side elements bosses similar to the bosses 22, 22' on the first upper element 2 in the cases described above, and serving as a bearing for the lower element of a supplementary high conduit.

In addition, while the foregoing description applies to the production of a segment of the structural system, with each conduit in fact being produced by placing end to end the desired number of adjacent segments, it is not necessary for the planes of transverse joints between the adjacent segments of the low conduit S1 and the high conduit S2 to coincide; on the contrary, overlap of the two conduits or, better yet, of the elements of each conduit, can improve the transmission of forces and reduce the risk of misalignment due to differing degrees of settling.

I claim:

1. An underground tubular structural system comprising in cross-section at least two sections arranged in parallel relation in a single longitudinal direction and positioned on a bottom (A) of a trench (B) and covered by a fill, said system comprising at least two conduits (S1, S2) of large cross-section constituted by prefabricated elements each covering a part of said cross-section in a transverse direction, said at least two conduits, namely, a low conduit (S1) and a first high conduit (S2), being superposed on one another, and said structural system comprising, in cross-section, at least three elements, namely, (a) a lower element (1) comprising a flat bed-plate resting on the ground (A) and having two lateral sides (14) provided with bearing members (16),
   (b) at least one intermediate element (6) comprising a floor (62) extending horizontally and having lateral parts (63) respectively provided on two opposing faces, respectively with lower (65) and upper (66) longitudinal bearing members,
   said intermediate element (6) capping said lower element (1) and resting on said bearing members (16) of the two lateral sides (14) along said lower bearing members (65) for closing said low conduit (S1), and
   (c) a vault shaped upper element (2') provided with two longitudinal bearing members (33'), said vault shaped element (2') capping said intermediate element for closing said high conduit (S2) and resting along its longitudinal bearing members (33') on said upper longitudinal bearing members (66) of said intermediate element (6).

2. An underground tubular structural system as claimed in claim 1, wherein said intermediate element (6) closing said low conduit (S1) comprises a vault-shaped lower face (61) forming a ceiling of said low conduit (S1) and a substantially flat upper face (62) forming a bottom of said high conduit (S2).

3. An underground tubular structural system as claimed in claim 1, wherein said intermediate element (6) closing said low conduit (S1) has an inverted U shape and comprises a floor extending horizontally over said lower element (1), wherein said lateral parts (63) are substantially vertical and rest on said bearing members (16) of said lower element (1) along said lower longitudinal bearing members (65).

4. An underground tubular structural system as claimed in any one of claims 1 to 3, wherein said lower element (1) and said vault-shaped upper element (2') belong to an existing conduit having a unique section, said lower element (1) staying in place on the ground and said upper element (2') being removed for placing said intermediate element (6).

5. An underground tubular structural system as claimed in any one of claims 1 to 3, wherein said longitudinal bearing members (65) of said intermediate element (6) each comprises an elongate centering shoulder (65) projecting along said lateral side (63) of said intermediate element (6) and engaging, when said elements are superposed, in a corresponding hollow groove (16) on the top of the corresponding lateral side (14) of said lower element (1).

6. An underground tubular structural system as claimed in claim 5, wherein said centering shoulder (65) and said groove (16) have rounded profiles which are respectively convex and concave, with a difference in curvature providing a slight transverse play such that said bearing member (65, 16) is articulated about a longitudinal axis.

7. An underground tubular structural system as claimed in any one of claims 1 to 3, comprising at least three superposed conduits, namely a said low conduit (S1) resting on the ground (A) and closed by said at least one intermediate element (6), said first high conduit (S2) closed by a second intermediate element (6') and at least one second high conduit (S'2) closed by said vault element (2').

8. A method for producing an underground tubular structural system by adding a supplementary conduit to an existing conduit, said existing conduit (S1) being formed by associated longitudinal elements which comprise in cross-section a lower element (1) resting on the ground and at least one vault-shaped upper element (2') resting along longitudinal bearing members (16) on lateral sides (14) of said lower element (1), said process comprising the steps of
(a) opening a trench (B) containing said existing conduit until said existing conduit (S1) is completely uncovered;
(b) removing said upper element (2') and replacing it by an intermediate element (6) having a lower face (61) comprising a central part in the shape of a plate (60) and two lateral parts (63) respectively provided with lower longitudinal bearing members (65) resting on said longitudinal bearing members (16) of said lower element (1) and said intermediate element (6) having an upper face (62) provided with two upper longitudinal bearing members (66) similar to those of said lower element (1); and
(c) closing said supplementary conduit (S2) by capping said intermediate element (6) with said upper element (2') which was previously removed and which comes to rest on said bearing parts (66) of said upper face (62) of said intermediate element (6).

9. An underground tubular structural system comprising in cross-section at least two sections arranged in parallel relation in a single longitudinal direction and positioned on a bottom (A) of a trench (b) and covered by a fill, said system comprising at least two conduits (S1, S2) of large cross-section constituted by prefabricated elements each covering a part of said cross-section in a transverse direction, said at least two conduits, namely, a low conduit (1) and a high conduit (S2), being superposed on one another, and said structural system comprising, in cross-section, at least three elements, namely,
(a) a lower element (1) comprising a flat bed-plate resting on the ground (A) and having two lateral sides (14) respectively provided with bearing members (16) each constituted by a groove having a concave profile;
(b) at least one intermediate element (6) comprising a floor (62) extending horizontally and having two substantially vertical lateral parts (63) respectively provided on two opposing faces, respectively with lower (65) and upper (66) longitudinal bearing members;
 (i) said intermediate element (6) capping said lower element (1) and resting on said bearing members (16) of said two lateral sides (14) along said lower bearing members (65) for closing said low conduit (S1);
 (ii) said lower bearing members of said intermediate element (6) each comprising an elongated centering shoulder (65) projecting along said lateral side (63) of said intermediate element (6) and engaging, when said elements are superposed, in a corresponding hollow groove (16) of said lower element (1);
 (iii) said upper bearing members (66) of said intermediate element (6) each being constituted by a groove having a profile identical to the profile of said grooves (16) of said lower element (1); and
(c) a vault-shaped upper element (2') having two lateral sides respectively provided with two longitudinal bearing members (33') each having a profile identical to the profile of said centering shoulders (65) of said intermediate element (6), said vault-shaped element (2') capping said intermediate element for closing said high conduit (S2) and resting along its longitudinal bearing members (33') each engaging, when said elements are superposed, in the corresponding groove (66) of said intermediate element (6).

* * * * *